INVENTORS:
Theodore F. Doll
Carl J. Schroeder

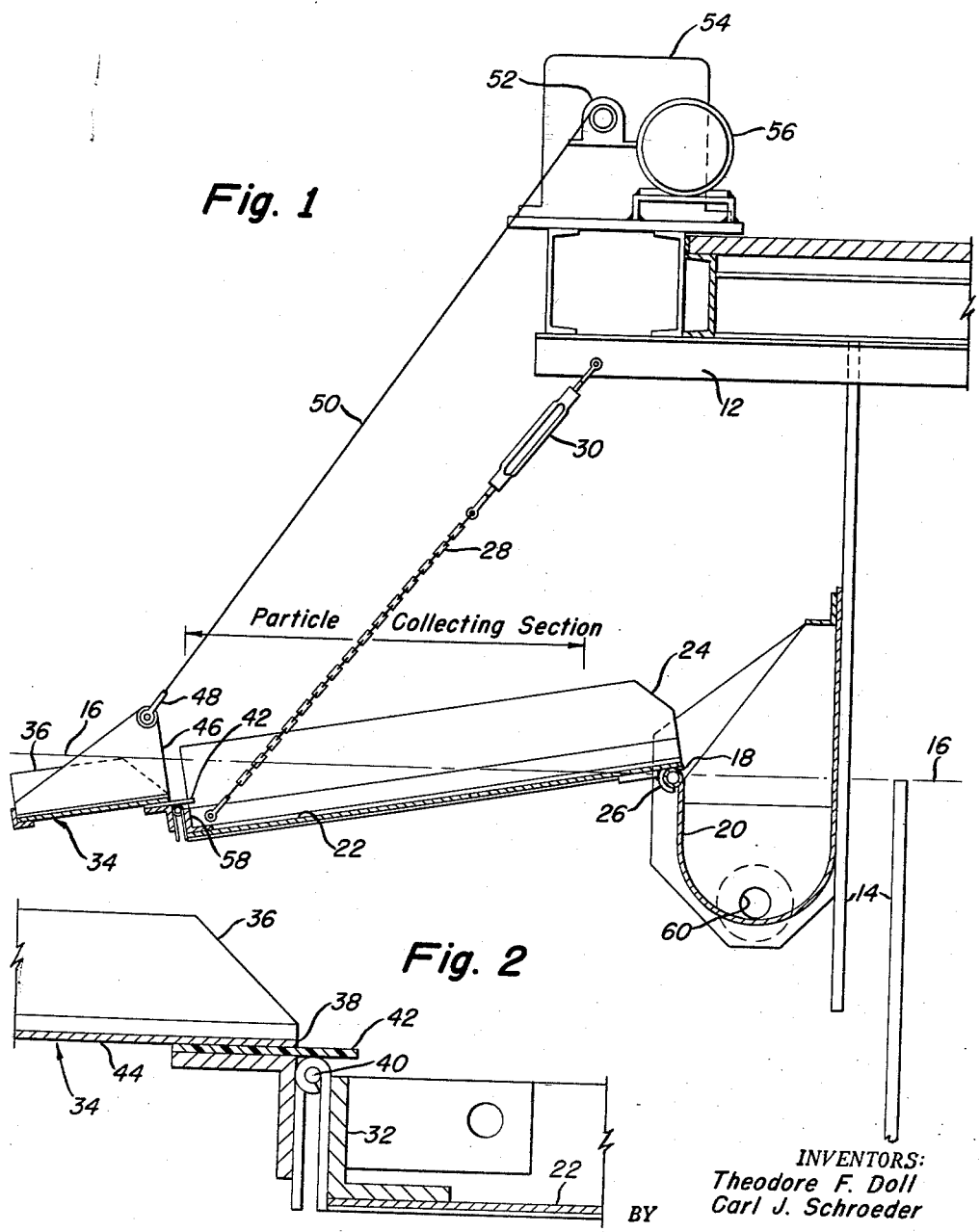

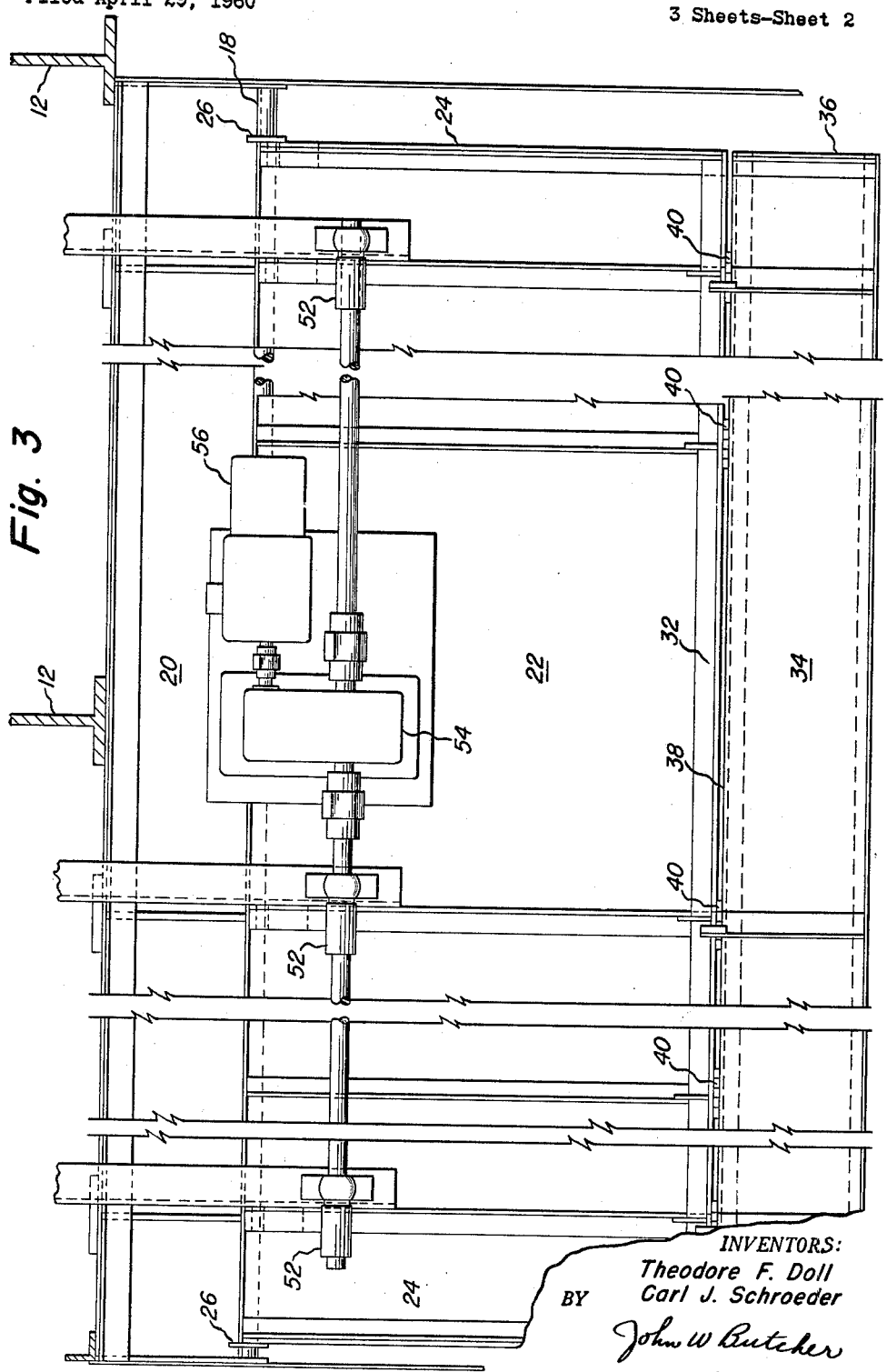

John W Butcher
ATTORNEY

United States Patent Office 3,081,879
Patented Mar. 19, 1963

3,081,879
SKIMMING APPARATUS
Carl J. Schroeder, Hammond, Ind., and Theodore F. Doll, Riverdale, Ill., assignors to Standard Oil Company, Chicago, Ill., a corporation of Indiana
Filed Apr. 29, 1960, Ser. No. 25,612
6 Claims. (Cl. 210—523)

This invention relates to obtaining improved skimming of fragile material from the surface of liquids and it pertains, more particularly, to the provision of an improved skimmer for removing a biological growth from the surface of a body of liquid.

The following description, which relates to the removal of a growth material from a body of water, is presented by way of illustration and not by way of limitation.

The petroleum industry has diligently devoted attention to the problem of waste water disposal. The waste waters are normally treated to free the waste waters of oil, undesirable chemicals, and undesirable tastes and odors. Petroleum waste waters may also contain organic matter and/or organisms which require biochemical oxidation. The extent of the required purification will, of course, depend upon each particular situation. The general appearance of the water is also an important factor, it being desirable that the dark color and almost black waste with an oily cast be converted into a clear water of light and brighter color.

A presettled refinery waste water such as, for example, the effluent from a conventional American Petroleum Institute (A.P.I.) separator may be subjected to a biological oxidation treatment (bioflotation process) to maintain the biological oxygen demand (B.O.D.); the phenolics content; the threshold odor number (T.O.N.); and oil content of the waste water within prescribed limits. The bioflotation process utilizes at least one elongated aerobic zone having an oxygenation apparatus at the inlet end thereof. The water, subsequent to the initial injection of oxygen or oxygen-containing gas, is maintained quiescent. A biological growth develops within the body of water. The growth apparently provides nuclei or absorptive floc for coalescing oil and for coalescing entrained organic matter and, at the same time, it tends to occlude the nitrogen and unused portion of oxygen, the occluded gas tending to make the particles sufficiently buoyant so that the biological growth particles float to the surface of the body of liquid. It is necessary to remove this growth from the surface of the body of liquid before the growth becomes deaerated or the growth will sink back into the liquid and/or accumulate on the bottom of the body of liquid thereby decreasing the effectiveness of the treatment.

The texture of the biological growth makes the growth difficult to remove from the surface of the water. Under normal operating conditions, the water flows from the inlet end of the aerobic zone to the effluent end thereof. As a result of the movement of the water, the biological growth collects on the surface of the water near the effluent end of the aerobic zone. The biological growth normally extends from a point beneath the surface of the liquid to a point above the surface of the liquid. If a conventional skimmer edge is positioned immediately below the surface of the water such as, for example, from about 0.1 inch to about 0.5 inch, the biological growth will adhere to the edge of the skimmer. The flow of the water will then tend to pile-up additional particles of biological growth upstream of the skimmer. These compressed particles become more dense and deaerated. The particles will then fall to the bottom of the water before reaching the skimmer. If, on the other hand, the skimmer edge is positioned substantially beneath the surface of the liquid such as, for example, in excess of about 0.5 inch beneath the surface whereby substantially all of the biological growth particles are above the edge of the skimmer, a large quantity of water is recovered in the skimmer along with the biological growth. The large volume of water then presents a separate undesirable treating and handling problem. The biological growth, in the absence of a suspension media such as, for example, water, will adhere to the collection and transfer means. This invention is particularly directed to a means for removal of this growth from a body of water such that a predetermined quantity of water is recovered along with the growth. The predetermined quantity of water acts as a suspension means for handling the recovered growth.

Briefly described, the present invention provides an apparatus for removing a floating biological growth from the surface of a body of liquid. An adjustable, impervious ramp is adapted to assume a growth collecting position which places a substantial portion of the ramp below the floating biological growth. The ramp is pivotally mounted such that it can be raised to assume a growth discharging position. The ramp is operatively positioned to discharge material into a growth disposal means. A provision is made to entrap a predetermined quantity of liquid above the ramp as the ramp is moved from the growth collecting position to the growth discharging position. When the ramp is in the growth collecting position, relative motion of the liquid with respect to the ramp results in a collection of the floating biological growth above the ramp. The provision whereby a predetermined quantity of liquid is entrapped above the ramp eliminates the problem of handling the biological growth in the absence of a suspension media. The entrapped liquid serves the function of carrying the biological growth through the growth disposal means.

The invention will be readily appreciated as the same becomes better understood by reference to the following detailed description when considered in connection with the accompanying drawings wherein:

FIGURE 1 is an elevational side view, partially in cross section, of the skimming apparatus;

FIGURE 2 is an enlargement, partially in cross section, of the connection between the ramp toe and the ramp;

FIGURE 3 is a plan view, partially in cross section, of the skimming apparatus.

Figure 4:
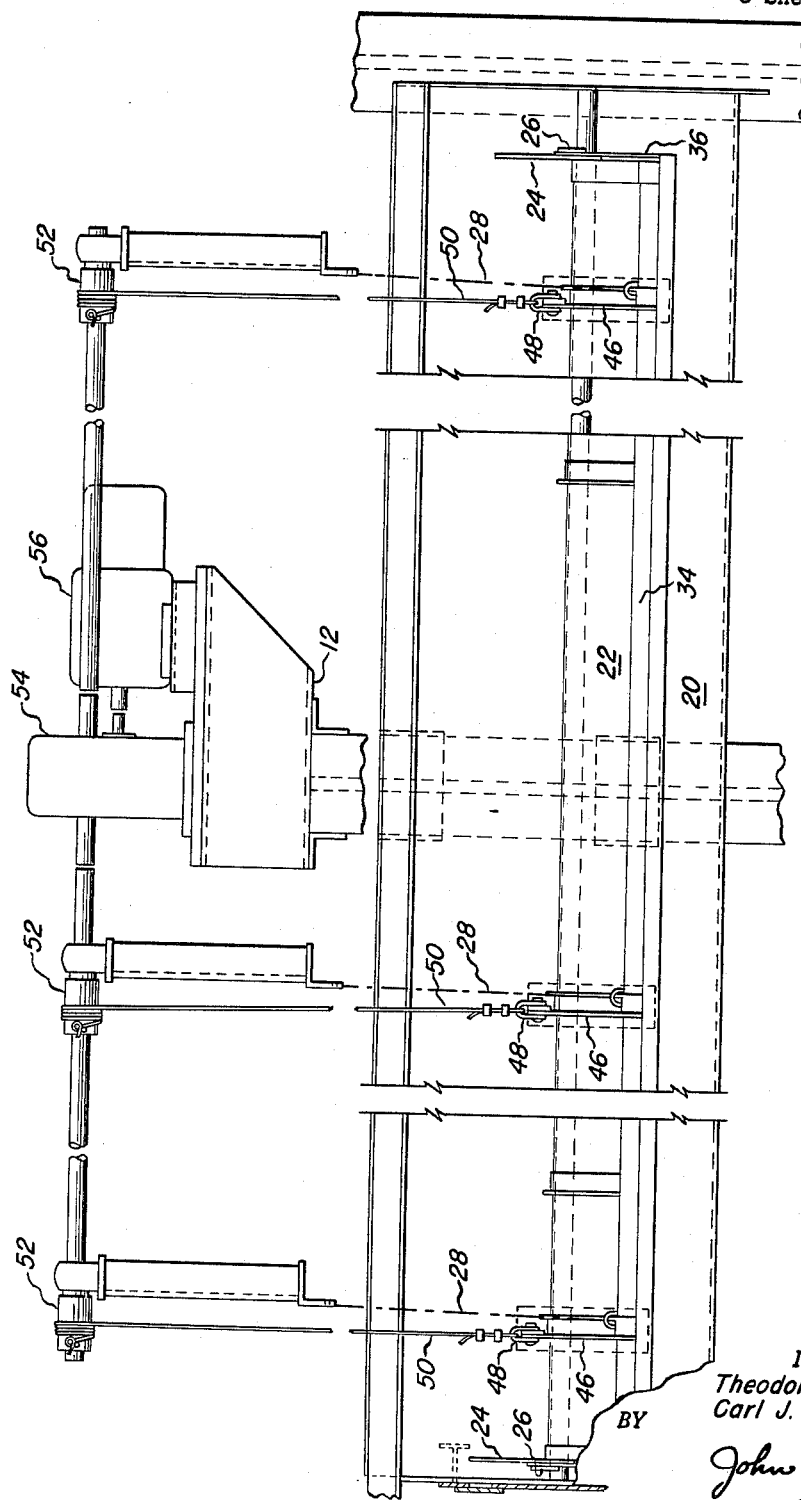
FIGURE 4 is an elevational end view, partially in cross section, of the skimming apparatus.

Referring now to the drawing and, more particularly, to FIGURE 1, the skimmer apparatus is positioned transverse to a flowing stream of liquid by way of a supporting framework 12. A depending baffle 14 extends into the water. The water level is maintained slightly below the upper edge 18 of the elongated trough 20. The elongated trough 20 extends parallel to the upper surface of the body of liquid. A ramp 22 having upwardly extending sides 24 is pivotally mounted by hinge 26 to the upper edge 18 of the elongated trough 20. A ramp adjustment chain 28 has an upper end attached to the supporting framework 12 and has a lower end attached to the ramp 22. An adjustment means, illustrated as a turnbuckle 30, is used to position the lower end 32 of the ramp 22 below the water level 16.

A ramp toe 34 having upwardly extending toe sides 36 has one edge 38 pivotally connected to the lower end 32 of the ramp 22 by toe hinge 40. A resilient flap 42 extends parallel to the bottom 44 of the ramp toe 34 to form a seal communicating the fluids from the ramp toe 34 into the ramp 22.

A toe plate 46 has attached thereto a clevis 48. A toe lift cable 50 has a lower end connected to the clevis 48 and an upper end connected to a cable drum 52. The cable drum 52 is driven by speed reduction means 54 which speed reduction means, in turn, is driven by motor 56. The cable drum 52, the speed reduction means 54, motor 56, and toe lift cable 50 comprise a means to lift the ramp toe 34 and the ramp 22. The cable drum 52, the speed reduction means 54, and the motor 56 are fixably connected to the supporting framework 12.

The driving motor 56 of the ramp elevating mechanism has incorporated therein, a conventional magnetic brake (not shown). An upper limit switch (not shown) is used to shut off the electrical energy input to the motor 56 when the ramp 22 is elevated to the growth discharging position. As the energy is shut off, the magnetic brake immediately sets to hold the motor 56, the speed reduction means 54, and the ramp 22 in the growth discharging position. The upper limit switch prevents the ramp elevating mechanism from lifting the ramp above a predetermined position. Likewise, a lower limit switch is used to shut off the energy to the motor 56 after the ramp 22 has been lowered to a growth collecting position. The use of an upper limit switch and lower limit switch in combination with the magnetic brake, provides a positive means of maintaining the toe lift cable 50 taut at all times.

In operation, waste water is directed into an inlet end of an elongated aerobic zone. Oxygenation apparatus such as, for example, a rotating brush, is used to inject oxygen or oxygen-containing gas into the water near the inlet end of the aerobic zone. Water in the aerobic zone downstream of the inlet end thereof is maintained quiescent so that biological oxidation and subsequent flotation occurs. The floating biological growth is carried by way of the flowing stream to the outlet end of the aerobic zone. This biological growth is carried to within the particle collecting section of the ramp 22.

The accumulation of biological growth particles in the particle collecting section of the ramp 22 may be sufficient to compress and deaerate the particles at which time the particles may fall from the surface of the water trapped above the ramp. The lip 58 retains the trapped liquid and the growth particles above the ramp 22. After a predetermined quantity of biological growth particles have been accumulated in the particle collecting section, the motor 56 is energized to actuate the speed reduction means 54. The speed reduction means 54 operates the cable drum 52 to raise the ramp toe 34 by means of the toe lift cable 50. The ramp toe 34 pivots with respect to the ramp 22 about the toe hinge 40 until the bottom surface of the ramp toe 34 is at approximately a 90° angle with the bottom of the ramp 22. At this time, the water above the bottom of the ramp 22 along with the accumulated biological growth particles is entrapped above the ramp 22. This feature (a means to entrap substantially all of the biological growth particles in the particle collecting section prior to the time the ramp 22 is elevated) is particularly preferable. For example, if the ramp 22 is raised with the ramp toe portion of the apparatus removed from the ramp, a determinable quantity of water (in the particle collecting section) above the ramp 22 will flow upstream. This quantity of water will carry with it, a quantity of floating material, thus, decreasing the efficiency of the skimming apparatus. Further winding of the cable drum results in raising the ramp 22 above the surface of the water 16. The ramp is raised until the water and accumulated biological growth particles discharge into the elongated trough 20. A conveyor means (not shown) may be installed in the trough 20; however, we have found a conveyor is not normally required. After the material is discharged into the elongated trough 20, the motor is reversed to rotate the speed reduction means such that the ramp is lowered to its growth collecting position as illustrated in FIGURE 1. The material collected along with the suspension carrier liquid in the elongated trough 20 flows by way of gravity or other means through the collection line 60.

The above description was directed to the use of the skimming apparatus with a flowing body of liquid. The skimming apparatus is adaptable to remove floating particles from a stationary body of liquid. Relative motion of the floating particles with respect to the skimmer may be achieved by other means. For example, a mobile supporting framework with the skimming apparatus attached thereto may be propelled relative to the surface of the stationary body of water. Alternatively, a stationary skimmer could be used on a stationary body of liquid by providing a means to collect the floating material and to position the floating material above the ramp. For example, a floating member may be propelled toward the arm such that growth particles between the floating member and the ramp are steered into the particle collecting section of the ramp 22.

Although we have described this invention by reference to specific embodiments, it is to be understood that this is by way of illustration only and that our invention is not limited thereto. Alternate features may be employed without departnig from the spirit and intent of our invention. Accordingly, we wish to be limited only by the scope of the appended claims.

We claim:

1. An apparatus for removing a floating biological growth from the surface of a body of liquid which apparatus comprises growth disposal means, a ramp operatively positioned to alternately assume a growth collecting position and a growth discharging position, means to move said ramp from one of said positions to the other of said positions, at least a substantial portion of said ramp being positioned below said floating growth when said ramp is in said collecting position, means to entrap a predetermined quantity of said liquid above said ramp together with collected growth when said ramp is moved from said collecting position to said discharging position, said ramp being adapted to discharge said entrapped liquid and said collected growth into said growth disposal means when said ramp is in said discharging position.

2. An apparatus for removing a floating biological growth from the surface of a body of liquid comprising a growth disposal means, a ramp adapted to assume a growth collecting position beneath the surface of said liquid and a growth discharging position above the surface of said liquid, said ramp pivotally mounted with respect to said growth disposal means and operatively positioned to discharge said biological growth and liquid into said growth disposal means when said ramp is in said growth discharging position, means to entrap a predetermined quantity of said liquid and collected biological growth by said ramp as said ramp is moved from said growth collecting position to said growth discharging position, means to move said biological growth above said ramp, and means to move said ramp from said growth collecting position to said growth discharging position to discharge therefrom entrapped liquid and collected biological growth.

3. An apparatus for removing a floating biological growth from the surface of a body of liquid comprising an enlongated trough, a liquid-retaining ramp pivotally mounted with respect to said trough whereby said ramp may be positioned substantially below said biological growth and whereby said ramp may be raised to a growth discharging position wherein said growth and liquid are discharged into said trough, means to entrap a predetermined quantity of said liquid together with collected biological growth above said ramp as said ramp is moved from said position below said biological growth to said growth discharging position, and means to move said ramp from said growth collecting position to said growth discharging position to discharge therefrom entrapped liquid and collected biological growth.

4. An apparatus for removing material from the surface of a flowing body of liquid comprising a framework fixably mounted above said surface, an elongated trough having an upper edge, said trough fixably attached to said framework such that said upper edge is positioned above said surface, a ramp having upwardly extending sides and having an upwardly extending lower end, said ramp pivotally mounted to said upper edge such that said ramp may be lowered to assume a growth collecting position and may be raised to assume a growth discharging position, a ramp toe having upwardly extending sides, said toe pivotally connected to said ramp, an adjustable ramp chain having a first end connected to said ramp and having a second end connected to said framework adapted to support said ramp in said growth collecting position, a ramp elevating mechanism connected to said framework, a toe lift cable having a first end connected to said ramp elevating mechanism and having a second end connected to said ramp toe whereby as said ramp elevating mechanism is energized, said ramp elevating mechanism first lifts said ramp toe whereby said ramp toe pivots with respect to said ramp to entrap material above said ramp and second lifts said ramp toe and said ramp to said growth discharging position.

5. An apparatus for removing floating material from the surface of a body of liquid comprising an elongated trough mounted above said surface, a ramp having upwardly extending sides, said ramp pivotally mounted with respect to said trough whereby said ramp extends at an angle to said surface from a point above said surface to a point substantially below said surface, an outer ramp toe having upwardly extending sides, said ramp toe pivotally mounted to said ramp, a ramp elevating mechanism connected to said ramp toe whereby as said ramp elevating mechanism is actuated said ramp toe is pivoted to entrap water and suspended floating material above said ramp and whereby said ramp is raised to discharge said water and said floating material into said elongated trough.

6. An apparatus for removing material from the surface of a flowing body of liquid comprising a framework fixably mounted above said surface, an elongated trough having an upper edge, said trough fixably attached to said framework such that said upper edge is positioned above said surface, a ramp adapted to assume a growth collecting position and adapted to assume a growth discharging position, a ramp toe pivotally connected to said ramp, an adjustment means adapted to maintain said ramp at a predetermined distance below said surface when said ramp is in said growth collecting position, and a ramp elevating mechanism adapted to move said ramp from one of said positions to the other of said positions.

References Cited in the file of this patent

UNITED STATES PATENTS

| | | |
|---|---|---|
| 2,318,436 | Tark | May 14, 1943 |
| 2,875,712 | Blau | Mar. 3, 1959 |

FOREIGN PATENTS

| | | |
|---|---|---|
| 675,815 | Great Britain | July 16, 1950 |